May 27, 1947.   W. H. BROOKS   2,421,112
FRUIT CAKE METHOD
Filed Dec. 19, 1944

INVENTOR.
WILLIAM H. BROOKS
BY
His Attorney

Patented May 27, 1947

2,421,112

UNITED STATES PATENT OFFICE 2,421,112

FRUIT CAKE METHOD

William H. Brooks, San Francisco, Calif.

Application December 19, 1944, Serial No. 568,884

2 Claims. (Cl. 99—86)

This invention relates to the baking of cakes, particularly the denser type of cakes and especially fruit cakes.

The principal object of the invention is to provide a method of commercially producing the type of cakes above mentioned which will have much less tendency to crumble when cut or sliced, than cakes produced from the same dough or mixture by the regular methods of baking and handling heretofore practiced.

Also such a cake which will better retain its moisture and flavor.

Other features and advantages of the invention will appear in the following description and accompanying drawings.

Before describing the drawings in detail, it may be stated that commercially made baker's cake of the denser textured variety such as plain pound cakes, raisin pound cake, fruit pound cake, nut pound cake, and the heavy fruit cakes generally, are usually kept for some time, some fruit cakes for many weeks, before being entirely consumed, and considerable trouble from the crumbling of such cakes has always been experienced, especially when the cakes have been kept for some time, tho even when fresh they are subject to this annoyance.

It is possible with certain types of ingredients in the mixture and manipulation to produce what is known in the trade as a "tight" or "bound" texture which will permit easier slicing without undue crumbling of the cake made therefrom, but from the type of mixture required such cakes are usually lacking in flavor.

I have discovered that with the ordinary or standard cake formulas for the above types of cakes I can produce a cake which will have high quality and flavor, will be long keeping, and substantially free of crumbling tendency. The process comprises baking the cakes in substantially the normal manner though preferably for somewhat longer under slightly lower heat so as to get an evener penetration of the heat while avoiding localized overheating with consequent driving out too much moisture from such areas, then a few minutes after baking is finished, while the cake is still warm, and before the vapors from within have carried the flavors outward, a weight or pressure is applied to the upper side of the cake to gradually compress and condense the cake structure all the way from about 10% to about 40% reduction in its height (depending on the type of cake), and entrap or lock all of the flavors and aromatics as well as residual moisture tightly within the materially closed pores or interstices.

The weight or pressure plate is applied gradually so as not to break or destroy the cell walls, as would result if the cake were instantly punched down, but to give the still warm cellular structure time to yield throughout in condensing without material rupture, so that when the cake is finally removed it will be without injury. In practice the weight or pressure is maintained for about two hours, or overnight for next day's delivery.

For purposes of illustration merely, the drawings show at 1 an ordinary oblong cake tin with slanted walls to facilitate removal of the cake, though the tin or pan may be of any shape, square, round, tube-pan (for central hole cakes) or any fancy form desired.

Figure 1:
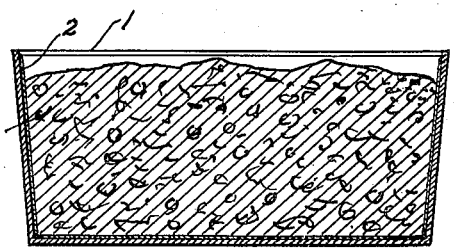
Fig. 1 is a longitudinal vertical section of a conventional cake pan with a baked cake within.

The pan is preferably lined interiorly with a liner 2 preferably of "wax-paper" or parchment paper, or sometimes an additional outer liner of thin cardboard is used. Within the lined pan the cake mixture is baked in an oven in the usual way and when removed a normal cake of the kind referred to appears about like the cake 3 of Fig. 1 substantially filling the pan 1.

Figure 2:
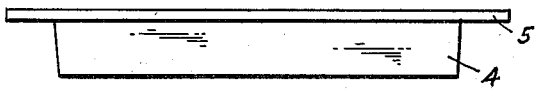
Fig. 2 is a side elevation of a flat weight adapted to fit freely into the cake pan.

Fig. 2 shows one type of weight which I have found practicable for applying the pressure. This weight has a body 4 of a depth to compress the cake to the desired degree and at which point an overhanging upper flange 5 comes into contact with the upper edge of the pan and stops further descent and compressing of the cake.

Figure 3:
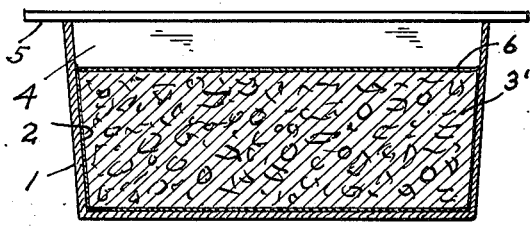
Fig. 3 is a view like that of Fig. 1 but with the weight placed upon the cake within the pan.

The weight should fit freely within the pan and only be heavy enough to gradually force the cake downward to final position as shown in Fig. 3 wherein the cake 3' is shown in finally compressed condition and with its upper surface leveled off by the pressure.

Before applying the weight, it is desirable to lay a sheet of wax paper 6 on top of the cake within the pan. This sheet should be a trifle large so that the weight will force the liner sheet and top sheet to unite all about the upper corners or edges of the cake, and which effect is contributed to by the moist adherent juices of the cake, so that when the compressed cake is finally removed it is hermetically sealed within a complete enclosing wall of wax paper or the like.

Instead of the weight or pressure plate having a plain flat under surface as in Figs. 2 and 3, it may be given any form which may be desired to impress upon the top of the cake. Thus in Fig. 4 the bottom of the weight is transversely fluted or corrugated as at 7 to thereby form successive ridges or slicing guides across the finally removed cake as indicated at 7' in Fig. 6 wherein 3'' denotes the wax paper enclosed compressed cake ready for the market, tho generally placed in a cardboard box for ease of handling and sanitary precautions.

Figure 4:
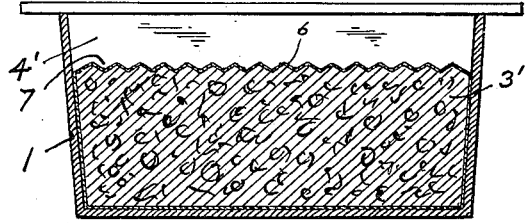
Fig. 4 is a view like that of Fig. 3 but showing a weight with a transversely fluted or corrugated lower side.
Figure 6:
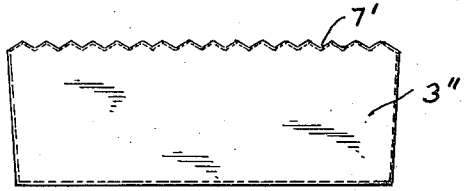
Fig. 6 is a side elevation of the cake of Fig. 4 removed from the pan.

It is evident from considering the special pressure formed surface of the weight 4' of Fig. 4 and its result, the cake of Fig. 6, that the pressure formations may take any shape desired, either ornamental and/or letters, brands, or trade-marks, which it is desired to permanently mold into the surface of the cake.

Figure 5:
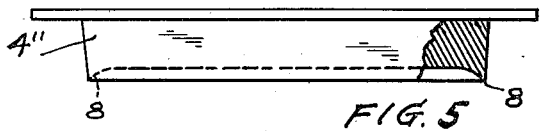
Fig. 5 shows a weight like that of Fig. 2 except that it has downwardly curved edges.

The weight may additionally have its edges curved downward as shown for the weight 4'' of Fig. 5 at 8 so as to round the edge of the cake at the same time.

In regard to the amount of weight to be used, there is considerable latitude in this, but experiments have shown me that about 10 lbs. per 50 square inches of surface area will be found satisfactory. The weight to be placed gently upon the cake and allowed to settle slowly. Of course, any equivalent means of pushing a plate down slowly will also be satisfactory, even to simply putting several filled and baked cakes with their pans one within the other, and preferably with a weight on the top one, but means would have to be provided to limit their descent or compressing action.

In the simple form of weight shown in the drawings, it is manifest that the limit flange 5 may be continuous all around, or at both ends, or both sides only.

I have found the best time to apply the weights is between fifteen and thirty minutes after the cakes have been removed from the oven, as the structure is then firmer and better able to yield gradually to the weight without collapsing. Tho the top covering of wax paper, if used, may be put on soon as convenient to prevent any escape of aromatics.

Cakes made by my novel method, above described, have been sold to the public along side the normal cakes, and have proven their greatly superior qualities as above enumerated by the constantly increasing demand.

In my appended claims my use of the word "paper" for the lining is intended to cover any suitable sheet lining material, paper, Cellophane, or the like, whether waxed or otherwise treated or not.

I claim:

1. The method of making a cake of the denser type which includes baking the cake in the normal manner and compressing the cake after baking is completed and the cake is still fresh and pliable so as to permanently reduce the volume of the cake an amount ranging from about 10 to about 40 per cent from the normal volume of the cake.

2. The method of making a cake of the denser type which includes baking the cake in the normal manner and compressing the cake after baking is completed and the cake is still warm so as to permanently reduce the volume of the cake, the compression being limited to reduce the cake an amount ranging from about ten to forty percent from its normal volume.

WILLIAM H. BROOKS.

REFERENCES CITED

The following references are of record in the file of this patent:

UNITED STATES PATENTS

| Number | Name | Date |
| --- | --- | --- |
| 673,069 | Wiley | Apr. 30, 1901 |
| 1,586,893 | Gay | June 1, 1926 |
| 1,815,569 | Johnson | July 21, 1931 |
| 2,241,040 | Pringle | May 6, 1941 |